UNITED STATES PATENT OFFICE.

FRANZ FLAECHER AND BAPTIST REUTER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

SALTS OF THE EXTRACTIVE PRODUCT FROM THE HYPOPHYSIS GLAND.

1,296,064.    Specification of Letters Patent.    Patented Mar. 4, 1919.

No Drawing. Application filed December 23, 1912, Serial No. 738,356. Renewed November 19, 1915. Serial No. 62,435.

*To all whom it may concern:*

Be it known that we, FRANZ FLAECHER, Ph. D., chemist, and BAPTIST REUTER, Ph. D., chemist, citizens of the Empire of Germany, residing at Höchst-on-the-Main, Germany, have invented certain new and useful Improvements in Salts of the Extractive Product from the Hypophysis Gland, of which the following is a specification.

In U. S. patent-application Ser. No. 722245 filed 25th Sept. 1912, is described a new product possessing the blood-pressure-raising, hemostatic, astringent and labor-pains-promoting properties of the physiologically-active element of the infundibular portion of the hypophysis gland, in a pure, concentrated and stable form. This product is a base, obtained as conglomerations of small yellowish-white prisms, difficultly soluble in alcohol, ether, ethyl-acetate and acetone, soluble in alkalis and acids, precipitated by the usual alkaloid reagents, giving a red coloration with diazotized sulfanilic acid in a solution alkaline with soda, and giving the biuret-reaction. The base is readily soluble in water, but it then shows an alkaline reaction which is of some disadvantage in its administration.

In order to obtain this basic product we proceed as follows:

We take the hypophysis extract which is prepared by extracting the well-ground infundibular portion of the hypophysis by means of slightly acidulated water, completely freeing the filtrate from albumen and evaporating it. The concentrated extract thus obtained is acidified with slightly diluted sulfuric acid, whereupon an aqueous solution of phosphotungstic acid is added until this precipitating agent no longer causes precipitation. The precipitate, which consists of the phosphotungstic compound of the active base, is well washed with water, acidified with sulfuric acid, and mixed and stirred with water so as to form a thin magma, and finally barium hydrate is added until there is a distinct alkaline reaction. The so-formed phosphotungstate of barium is filtered off, the filtrate is freed from the dissolved barium by addition of diluted sulfuric acid, taking care to avoid an excess of this acid, and is then evaporated *in vacuo* to crystallization; or the base may be precipitated by means of alcohol, acetone, etc., washed with alcohol and dried *in vacuo*.

Now we have found that the salts obtainable from the said base do not show the aforementioned disadvantage. These salts are well-crystallized, stable, readily soluble in water and have the same physiological action as the base.

Thus we prepare for instance the sulfate of the said base by dissolving it in a small quantity of water and adding to this solution diluted sulfuric acid until there is a slightly acid reaction. The concentrated solution is then evaporated in a vacuum to the point of crystallization. The sulfate of the active substance of the hypophysis, thus obtained, forms a slightly yellowish, stable, crystalline powder, which decomposes at 160–161° C. and readily dissolves in water, with slightly acid reaction, and is difficultly soluble in alcohol, ether, ethyl-acetate and acetone; it shows the diazo reaction referred to by Pauly (see *Zeitschrift für Physiologische Chemie*, vol. 42, page 516), giving a red coloration when treated with diazotized sulfanilic acid in a solution alkaline with soda. It also shows the biuret-reaction and is precipitated by the usual alkaloid reagents. When subjected to Erdmann's test, the salt first becomes colorless, then yellow; when subjected to Fröhde's test, first colorless, then yellow, afterward green and again yellow; in presence of vanadium-sulfuric acid, first colorless, then pure yellow.

In the place of sulfuric acid there may also be used other acids, for instance hydrochloric acid, nitric acid, boric acid, succinic acid, oxalic acid, citric acid, tartaric acid, acetic acid, benzoic acid, salicylic acid, etc., in which case the solid salts of the base, corresponding to the acids used, are obtained.

The solutions in water of the before-mentioned salts are of great value for therapeutical purposes. The solution obtained by dissolving such a salt-composition in water, for example the sulfate, has a slightly acid reaction, and possesses the blood-pressure raising, hemostatic, astringent and labor-pains promoting properties of the principles of the hypophysis gland; it is precipitated by the usual alkaloid reagents, giving a red coloration when treated with diazotized sulfanilic acid in a solution alkaline with sodium carbonate, and showing the biuret-reaction. When the solution is cautiously evaporated in vacuo, a salt, for example the sulfate, remains, which forms a yellowish-white, stable, crystalline powder and decomposes when heated to 160–161° C., and which is readily soluble in water with slightly acid reaction, also soluble in acids and alkalis, difficultly soluble in alcohol, ether, ethyl-acetate and acetone. If it is subjected to Erdmann's test, it first becomes colorless and afterward yellow; if subjected to Froehde's test, first colorless then pure yellow, and if treated with vanadium-sulfuric acid, first colorless and afterward pure yellow.

Having now described our invention, what we claim is:

1. As new compositions of matter, crystalline salts of a basic substance, such as can be obtained from the infundibular lobe of the pituitary gland by the herein described process which comprises extracting the lobe with slightly acidulated water and precipitating the basic substance from said extract with phosphotungstic acid, said salts having hemostatic, astringent, blood-pressure raising and labor-pains promoting properties, being soluble in water with slightly acid reaction, difficultly soluble in alcohol, ether, acetone and ethyl acetate, readily soluble in acids and alkalis, being precipitated by the usual alkaloid reagents, giving a red coloration when treated with diazotized sulfanilic acid in a solution alkaline with soda, and giving the biuret-reaction.

2. The substance consisting of a crystalline sulfate of a basic substance, such as can be obtained from the infundibular lobe of the pituitary gland by the herein described process which comprises extracting the lobe with slightly acidulated water and precipitating the basic substance from said extract with phosphotungstic acid, said salt being a faint yellowish-white, stable, crystalline powder, decomposing at 160–161° C., readily soluble in water with slightly acid reaction, difficultly soluble in alcohol, ether, acetone, ethylacetate, also soluble in acids and alkalis, being precipitated by the usual alkaloid reagents, giving a red coloration when treated with diazotized sulfanilic acid in a solution alkaline with soda, showing the biuret-reaction, and possessing the properties of the hemostatic, astringent, blood-pressure raising and labor-pains promoting principle of the infundibular portion of the hypophysis gland.

3. Water solutions of salts of a basic substance, (such as can be obtained from the infundibular lobe of the pituitary gland by the hereindescribed process which comprises extracting the lobe with slightly acidulated water and precipitating the basic substance from said extract with phosphotungstic acid), said solutions having a slightly acid reaction and being characterized by their hemostatic, astringent, blood-pressure raising and labor-pains promoting action, said solutions being precipitated by the usual alkaloid reagents, assuming a red coloration when treated with diazotized sulfanilic acid in a solution alkaline with sodium carbonate, giving the biuret-reaction, and yielding when cautiously evaporated in vacuo, crystalline bodies which are organic salt-combinations forming yellowish-white, stable, crystalline powders, decomposing when heated, readily soluble in water with slightly acid reaction, soluble in acids and alkalis, and difficultly soluble in alcohol, ether, acetone and ethyl-acetate.

4. A water solution of the sulfate of a basic substance, (such as can be obtained from the infundibular lobe of the pituitary gland by the hereindescribed process which comprises extracting the lobe with slightly acidulated water and precipitating the basic substance from said extract with phosphotungstic acid), said solutions having a slightly acid reaction and being characterized by its hemostatic, astringent, blood-pressure raising and labor-pains promoting action, said solution being precipitated by the usual alkaloid reagents, assuming a red coloration when treated with diazotized sulfanilic acid in a solution alkaline with sodium carbonate, giving the biuret-reaction, and yielding when cautiously evaporated in vacuo a crystalline body which is an organic salt-combination, which combination forms a yellowish-white, stable, crystalline powder, decomposing when heated to 160–161° C., readily soluble in water with slightly acid reaction, soluble in acids and alkalis, and difficultly soluble in alcohol, ether, acetone and ethyl-acetate.

In testimony whereof, we affix our signatures in presence of two witnesses.

FRANZ FLAECHER.
BAPTIST REUTER.

Witnesses:
  JEAN GRUND,
  CARL GRUND.